United States Patent [19]

Makino

[11] Patent Number: 5,743,365

[45] Date of Patent: Apr. 28, 1998

[54] LOCK-UP DAMPER DEVICE FOR FLUID TRANSMISSION APPARATUS

[75] Inventor: Tetsuya Makino, Fuji, Japan

[73] Assignee: Jatco Corporation, Japan

[21] Appl. No.: 639,625

[22] Filed: May 1, 1996

[51] Int. Cl.[6] ................................................ F16H 45/02
[52] U.S. Cl. ........................... 192/3.29; 192/212; 464/66
[58] Field of Search .......................... 192/3.28, 3.29, 192/3.3, 212; 464/66, 67

[56] References Cited

U.S. PATENT DOCUMENTS

| 4,240,532 | 12/1980 | Blomquist | 192/3.28 |
|---|---|---|---|
| 4,646,886 | 3/1987 | Nishimura | 192/3.28 |
| 4,875,562 | 10/1989 | Fujimoto | 192/3.28 |
| 4,903,803 | 2/1990 | Koshimo | 192/3.28 |
| 5,080,215 | 1/1992 | Förster et al. | |
| 5,105,921 | 4/1992 | Fujimoto | 192/3.28 |
| 5,195,622 | 3/1993 | Tauvron | 192/3.29 |

*Primary Examiner*—Richard M. Lorence
*Attorney, Agent, or Firm*—Rossi & Associates

[57] ABSTRACT

A lock-up damper includes a driving plate or flange formed integrally with a radially outer flange of a lock-up piston, a driven plate fixed to an outer peripheral portion of a turbine shell, and coil springs which are mounted between the driving and driven plates, such that the inner, front and rear sides of the coil springs are supported by the driven plate, and the outer sides thereof are supported by the inner surface of the driving plate.

The driven plate consists of a single annular plate having inner, front and rear support faces for supporting the coil springs, and the front and rear faces do not extend beyond two orthogonal lines that are tangent to the coil spring and extend in parallel with the lock-up piston and the outer flange, respectively.

10 Claims, 12 Drawing Sheets

FIG. I

LOCK-UP DAMPER DEVICE FOR FLUID TRANSMISSION APPARATUS

BACKGROUND OF THE INVENTION

1. Field of the Invention

The present invention relates to a lock-up damper device for a fluid transmission device having a lock-up clutch for directly connecting an input shaft and an output shaft with each other.

2. Description of the Prior Art

A known lock-up damper device for a fluid transmission apparatus has a lock-up damper including a driving plate provided on the side of a lock-up piston, a driven plate provided on the side of a turbine runner, and coil springs interposed between the driving plate and the driven plate. This lock-up damper is adapted to absorb torsional vibrations applied thereto in its circumferential direction, which vibrations are included in the drive force transmitted from the driving shaft to the driven shaft during engagement of a lock-up clutch. Examples of such lock-up damper device are disclosed in Japanese Patent Publication No. 60-54546, and Japanese Utility Model Application Laid-open No. 63-75656.

In the conventional lock-up damper device for the fluid transmission apparatus, however, a radially outer portion of the driving plate 21 is fitted into a notch or recess 22 formed in a radially outer flange of the lock-up piston 23, as shown in FIGS. 14A and 14B, so that the driving plate 21 is attached to the lock-up piston 23. This driving plate 21 is disposed between two sheets of the driven plate 24 that support the coil springs 25. In this arrangement, the drive force is transmitted from the driving plate 21 to the driven plate 24 upon engagement of the lock-up clutch.

Since slight clearances are present between a fitting portion 26 of the driving plate 21 and the notch 22 of the outer flange of the lock-up piston 23 which receives the fitting portion 26, and between the driving plate 21 and the coil springs 25, rattling may occur during transmission of the varying drive force, for example.

The rattling may be effectively reduced by improving the dimensional accuracy of the fitting portion 26 of the driving plate 21 and the recess 22 of the outer flange, so as to reduce the clearances therebetween. In this case, however, the number of manufacturing and controlling steps is undesirably increased, resulting in an increased manufacturing cost.

In another example of conventional lock-up damper device as shown in FIG. 14C, the driven plate 32 provided on the side of the turbine runner, which functions to support the coil springs 25, comprise two plate members, that is, a first plate member 33 having inner and rear support faces 35 and outer and rear support faces 36 for supporting the corresponding sides of the coil springs 25, and a second plate member 34 having inner and front support faces 37 and outer and front support faces 38 for supporting the corresponding sides of the coil springs 25. The use of the two plate members connected to each other by means of a connecting pin increases the number of components and consequently increases the weight of the lock-up damper device.

In the above example, a sufficiently large clearance needs to be provided between the periphery of the coil spring 25 and the inner surface of the lock-up piston 39, so as to enable the driven plate 32 to support the front and outer sides of the coil spring 25 with high reliability. The provision of the clearance, however, increases the axial and radial dimensions of the lock-up damper.

In a further example of the lock-up damper device for the fluid transmission apparatus as disclosed in Japanese Utility Model Application Laid-open No. 63-75656, the driven plate 44 provided on the side of the turbine runner consists of a single plate having no support face for supporting the coil springs 25 as shown in FIG. 15. Thus, the coil springs 25 are supported only by the driving plate 41 provided on the side of the lock-up piston 49.

In this case, the lock-up piston 49 and the driving plate 41 are superposed on and fixed to each other, to provide a double-layer structure for supporting the coil springs. Consequently, the axial and radial dimensions of the lock-up damper device are increased by an amount including at least the thickness of the driving plate.

Further, the driving plate 41 includes an outer support portion 42, and a rear support portion 43 formed at the distal end of the outer support portion 42, for supporting each of the coil springs 25.

Accordingly, the driving plate 41 is likely to suffer from cracks due to the centrifugal force applied to the rear support portion 43 during high-speed rotation of the plate. To solve this problem, the driving plate 41 needs to be reinforced by increasing the length of the outer flange 50 of the lock-up piston 49, which results in an increase in the weight of the lock-up damper.

SUMMARY OF THE INVENTION

It is therefore a first object of the present invention to provide a lock-up damper device for a fluid transmission apparatus having a lock-up clutch for directly connecting an input shaft and an output shaft with each other, which is available at a reduced cost and wherein a driving plate is free from rattling during transmission of the drive force through the lock-up clutch.

The first object may be accomplished according to a first aspect of the present invention, which provides an apparatus comprising: a fluid transmission device comprising a cover, a pump impeller connected to an input shaft of the device through the cover, and a turbine runner connected to an output shaft of the device and disposed such that the turbine runner is opposed to the pump impeller with a fluid being present therebetween; a lock-up piston disposed between the turbine runner and the cover of the fluid transmission device, and selectively placed in one of a lock-up release position for transmitting a drive force through the fluid circulating in the fluid transmission device, and a lock-up engaging position for directly connecting the input shaft and output shaft with each other to transmit the drive force; and a lock-up damper for absorbing torsional vibrations included in the drive force when the lock-up piston is placed in the lock-up engaging position, the lock-up damper comprising a driving plate disposed on the side of the lock-up piston, a driven plate disposed on the side of the turbine runner, and a plurality of coil springs mounted between the driving plate and the driven plate, wherein the driving plate is located inside an outer flange of the lock-up piston and formed integrally with the lock-up piston.

There will be described an operation of the above-described apparatus when applied to an automatic transmission of an automobile. The lock-up piston disposed between the turbine runner and the cover or housing of the fluid transmission device is selectively placed in the lock-up release position and the lock-up engaging position, depending upon running conditions of the automobiles. The lock-up piston is placed in the lock-up engaging position when a lock-up clutch including the piston and the cover is fully or partially engaged, namely, the lock-up piston is rotated with the cover with or without a suitable amount of slip.

When the lock-up piston is placed in the lock-up release position, the drive force is transmitted through the fluid that circulates in the pump impeller and turbine runner. When the lock-up piston is placed in the lock-up engaging position, on the other hand, the drive force is transmitted from the input shaft to the output shaft, through the cover, lock-up piston (lock-up damper) and the turbine runner, so that the input and output shafts are directly connected to each other, or substantially connected to each other while allowing relative rotary movements thereof.

The driven force transmitted to the lock-up piston suddenly changes to a great extent when the lock-up piston is shifted from the lock-up release position to the lock-up engaging position or vice versa. The transmitted drive force also changes under the lock-up and partial lock-up conditions, due to changes of the load applied to the lock-up piston. In these cases, the coil springs retract and expand due to relative rotary displacement between the driving plate and driven plate of the lock-up damper, so as to absorb torsional vibrations included in the transmitted drive force and applied to the damper in its circumferential direction.

Since the driving plate is formed integrally with the lock-up piston such that the plate is located inside the radially outer flange of the piston, no clearance or gap is present between the driving plate and the lock-up piston, and rattling can be avoided when the torsional vibrations are applied to the lock-up damper.

The driving plate is formed as an integral part of the lock-up piston, without requiring steps of forming notches in the output flange of the lock-up piston and fitting portions of the driving plate with high dimensional accuracy, as in the conventional case where the driving plate is fitted into the notches of the outer flange of the lock-up piston. This reduces the number of steps of manufacturing and controlling the lock-up damper, resulting in a reduced manufacturing cost.

In one preferred form of the first aspect of the invention, the driving plate has a plurality of slots formed through the outer flange of the lock-up piston, and a plurality of driving claws formed by bending inward parts of the outer flange that are surrounded by the respective slots. In this case, the driving plate, which also functions as the outer flange of the lock-up piston, does not increase the number of components of the lock-up damper, resulting in a reduced manufacturing cost.

Preferably, each of the driving claws is bent inward at a proximal portion thereof when parts of the outer flange of the lock-up piston are bent inward to provide the driving claws, and recesses are formed on the opposite sides of the proximal portion of the driving claw. In this case, the bending angle of the driving claws can be subtly and accurately controlled due to provision of the recesses, assuring high positional accuracy of the driving claws.

Preferably, the slots formed through the outer flange of the lock-up piston are U-shaped, so that the driving plate includes an annular or continuous reinforcing portion formed at an edge portion thereof over the entire circumference of the driving plate, with the driving claws formed inwardly of the annular reinforcing portion.

In producing the driving plate, the U-shaped slots are formed through the outer flange of the lock-up piston, and parts of the outer flange are bent along these slots, to provide the driving claws. As a result, the annular reinforcing portion is left at the edge portion of the outer flange, to continuously extend over the entire circumference of the flange, with the driving claws formed inwardly of the annular reinforcing portion.

In this arrangement, even if a relatively large centrifugal force is applied to the outer flange due to rotation of the lock-up piston upon engagement of the lock-up clutch, the flexural strength of the driving plate differs only to a small extent between its portions having the driving claws and other portions having no driving claws. Accordingly, an engaging face of the lock-up piston on which a facing pad is provided does not suffer from waviness due to the difference in the flexural strength between different portions of the driving plate, thus assuring a high degree of flatness.

The above-described arrangement consequently avoids judder that may otherwise occur due to unevenness of the pressure applied to the engaging face of the lock-up piston, and resulting variation in the coefficient of friction. Further, the facing pad provided on the lock-up piston uniformly wears away, in other words, does not suffer from excessive wear in local areas thereof, thereby assuring improved durability and reliability.

In another preferred form of the first aspect of the present invention, the driving plate consists of a single annular plate having a plurality of driving claws, and the driving plate is fixed to an inner surface of the outer flange of the lock-up piston, so that the driving plate is formed integrally with the lock-up piston. Thus, the driving plate according to the present invention can be easily formed integrally with a conventional lock-up piston, without making any change of the design of the lock-up piston.

It is a second object of the present invention to provide a lock-up damper device for a fluid transmission apparatus having a lock-up clutch for directly connecting the input and output shafts with each other, wherein a driven plate is provided without significantly increasing the weight of the lock-up damper, while controlling the axial and radial dimensions of the lock-up damper to minimum.

To accomplish the second object, the driven plate, consisting of a sheet of annular plate, has an inner support face, a front support face and a rear support face for supporting each coil spring, and the distal ends of the front support face and rear support face are located inside two orthogonal lines that are tangent to a periphery of the coil spring and extend in parallel with the lock-up piston and the outer flange of the lock-up piston.

Before assembling of the lock-up damper, the coil springs are held by the driven plate fixed to an outer peripheral portion of a turbine shell of the turbine runner, and the driving plate is formed integrally with the outer flange of the lock-up piston. The lock-up piston having the driving plate or flange as an integral part is then fitted onto the turbine shell in the axial direction, such that the driven claws of the driven plate are appropriately positioned relative to the driving claws of the driving plate in the circumferential direction. In this manner, the lock-up damper is assembled together for installation on the present apparatus.

Since the driven plate does not include outer support portions for supporting the outer sides of the coil springs, the coil springs can be assembled into the driven plate, through its openings corresponding to the outer support portions. During the assembling of the lock-up damper, the coil springs are appropriately supported or retained by the inner, front and rear support faces of the driven plate.

The driving plate is a part of the outer flange of the lock-up piston, or a single component formed integrally with the lock-up piston, while the driven plate is a single component consisting of a sheet of annular plate which does not include the outer support portions that need to be reinforced to resist a large centrifugal force applied thereto. Thus, the provision of these driving and driven plates does not significantly increase the weight of the lock-up damper.

The front and rear support faces of the driven plate do not extend beyond the two orthogonal lines that are tangent to the periphery of the coil spring and extend in parallel to the lock-up piston and the outer flange of the lock-up piston, respectively.

Further, the driving plate is formed at the outer flange of the lock-up piston without increasing the axial dimension of the lock-up damper. Moreover, the driven plate does not include the outer support portions which may increase the radial direction of the lock-up damper, and thus can be formed without protruding from the periphery of the coil spring. Accordingly, the axial and radial dimensions of the lock-up damper can be set at minimum values.

To accomplish the first and second objects as indicated above, and yield the above effects, the lock-up damper comprises a driving plate formed integrally with an outer flange of a lock-up piston, a driven plate that consists of a single annular plate fixed to an outer peripheral portion of a turbine shell of a turbine runner, and coil springs interposed between the driving plate and the driven plate and supported at the inner, front and rear sides by the driven plate and at the outer sides by an inner surface of the driving plate.

When the lock-up damper that has been assembled together is installed on the automobile, the outer sides of the coil springs are supported by an inner surface of the driving plate, whereby all of the inner, outer, front and rear sides of the coil springs are appropriately supported during the installation of the lock-up damper on the automobile. Namely, the inner, front and rear sides of the coil springs are supported by the driven plate, and the outer sides of the coil springs are supported by the inner surface of the driving plate.

Consequently, the lock-up damper can be accommodated or fitted in a relatively small space defined between the outer peripheral portion of the turbine shell and the inner surface of the lock-up piston, which space has a length a little larger than the diameter of the coil spring.

Further, the driving plate, which is formed integrally with the outer flange of the lock-up piston, is free from any clearance or gap between the driving plate and the lock-up piston, and therefore does not suffer from rattling.

Preferably, the driven plate includes a coil spring holding portion protruding toward the lock-up piston to provide the inner support face and the front support face for supporting the inner and front sides of each of the coil springs. This coil spring holding portion is adapted to hold substantially a middle portion of the coil spring, and has a length that is about one third of the whole length of the coil spring.

In this arrangement, the coil spring has relatively long retractable portions on the opposite sides of the coil spring holder portion, each of which retractable portions has a length that is about one third of the whole length of the coil spring.

Accordingly, the coil spring holder portion does not affect the vibration absorbing function of the coil spring even when torsional vibrations having a relatively large amplitude are applied in the circumferential direction to the coil spring.

Since the inner and front support faces are provided by the coil spring support portion whose length is about one third of the whole length of the coil spring, the inner and front sides of the coil spring are supported by these inner and front support faces with high reliability.

Preferably, the driven plate includes a plurality of driven claws for supporting end faces of the coil springs, and each of the driven claws has a front support portion formed at a distal end thereof for supporting the front side of the corresponding coil spring. In this arrangement, the middle portion of the front side of the coil spring is supported by the front support face of the above-indicated coil spring holding portion, and the opposite end portions of the front side of the coil spring are supported by the front support portions of the driven claws. Thus, the front side of each of the coil springs is supported at three points, assuring high supporting function for the coil springs.

Preferably, the driven plate is disposed at an outer peripheral portion of a turbine shell of the turbine runner, and includes fixing portions in the vicinity of the driven claws at which the driven plate is integrated with the turbine shell.

When the driven plate is provided on the side of the turbine runner, the driven plate is positioned at the peripheral portion of the turbine shell, and fixed by spot welding to the turbine shell for integration therewith. The fixed portions of the driven plate are located in the vicinity of the driven claws, namely, at flat parts between the driven claws and the coil spring holding portion.

Thus, the driven plate can be easily and surely fixed at a plurality of fixing portions to the turbine shell, by spot welding, for example, so that the driven plate is formed integrally with the turbine shell.

Preferably, the driven plate includes a plurality of U-shaped driven claws which contact end portions of the coil springs through spring sheets, over at least half of the circumference of each of the coil springs, and the driving plate includes a plurality of driving claws that are kept spaced apart from the driven claws by a predetermined distance irrespective of the position of the lock-up piston relative to the cover of the fluid transmission device.

In this arrangement, the coil springs are supported at the end faces by the U-shaped driven claws of the driven plate which contact the end faces over at least half of the circumference thereof, assuring high supporting function for the coil springs.

During movement of the lock-up piston toward and away from the cover of the fluid transmission device, a predetermined clearance is kept between the driven claws and the driving claws of the driving plate, irrespective of the position of the lock-up piston relative to the cover. Thus, the driven and driving claws are prevented from interfering with each other irrespective of the position of the lock-up piston relative to the cover.

Preferably, each of the driving claws of the driving plate has a load point located approximately at the center of a corresponding one of the coil springs when the lock-up piston is placed in the lock-up engaging position. In this arrangement, the coil springs are adapted to retract and expand with the load point of the driving claws located approximately at the center of the coil springs, so as to absorb the torsional vibrations applied thereto in the circumferential direction, without twisting or bending due to the load applied from the driving claws to the coil springs.

Thus, the torsional vibrations are effectively absorbed by the coil springs during the engagement of the lock-up clutch.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

Referring to FIG. 1 through FIG. 10, there will be described in detail the first embodiment of the present invention.

Figure 1:
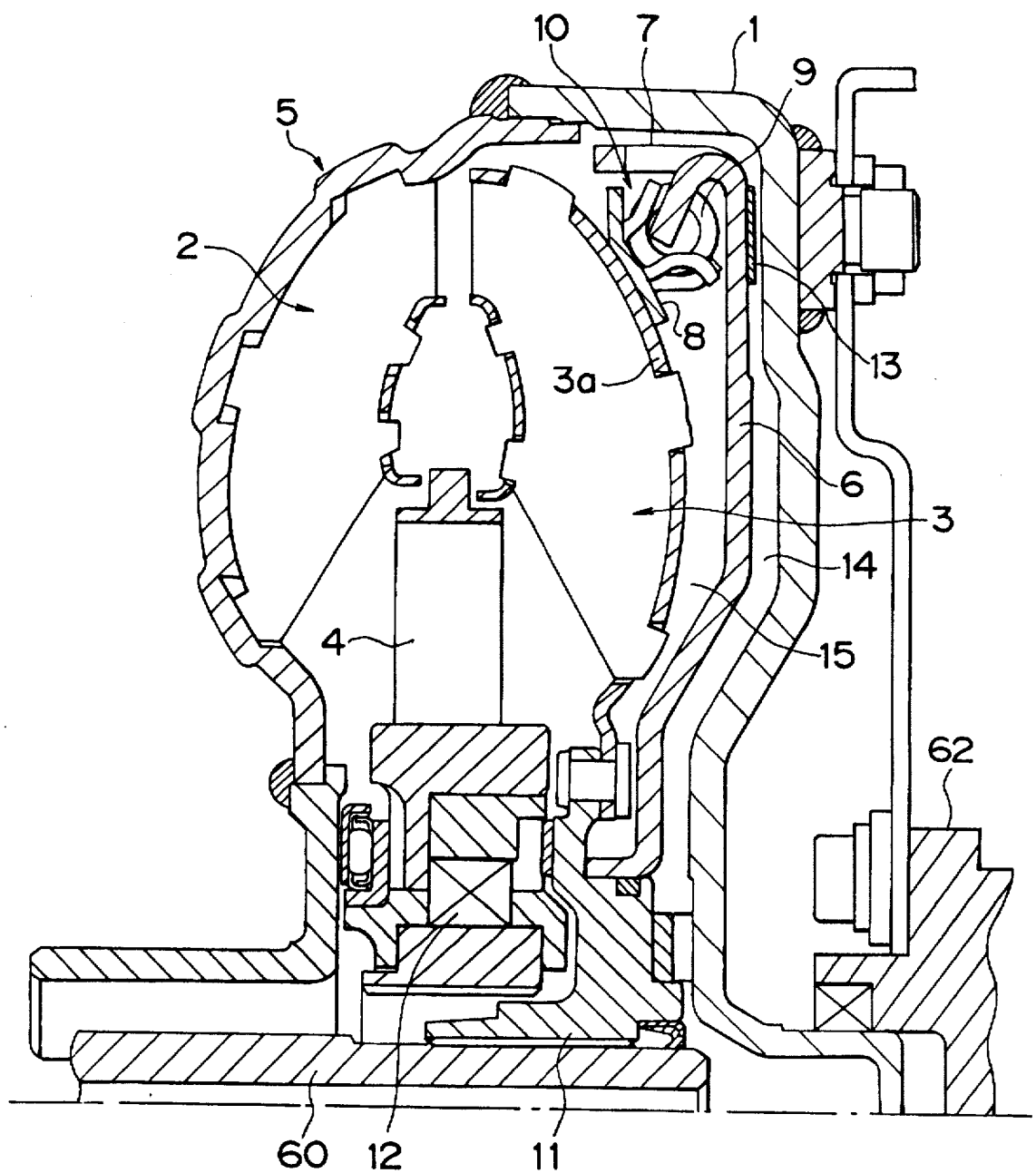
FIG. 1 is a cross sectional view showing a torque converter including a lock-up damper device constructed according to the first embodiment of the present invention.
Figure 2:
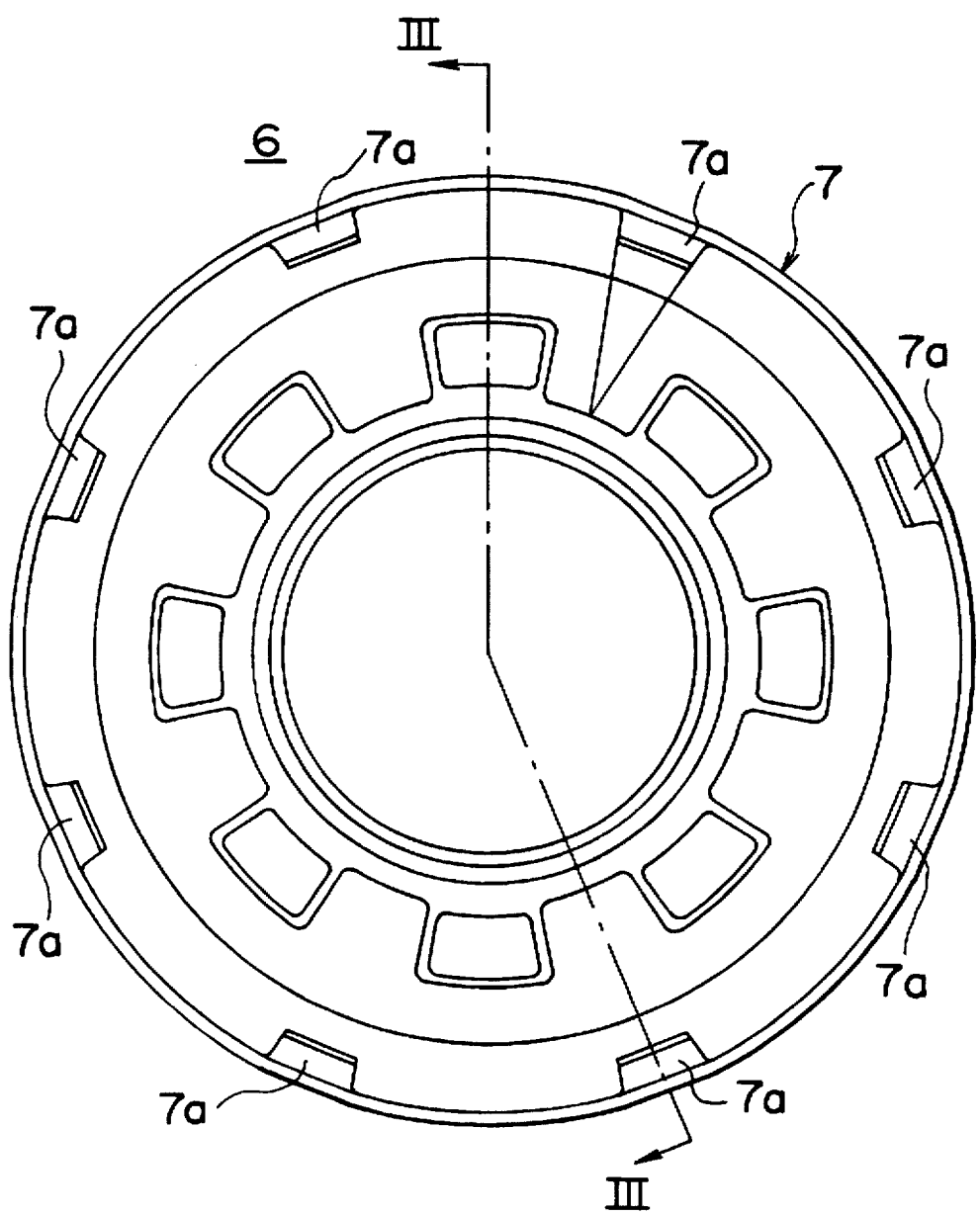
FIG. 2 is a front view showing a lock-up piston having a driving plate or flange of the lock-up damper of FIG. 1.
Figure 3:
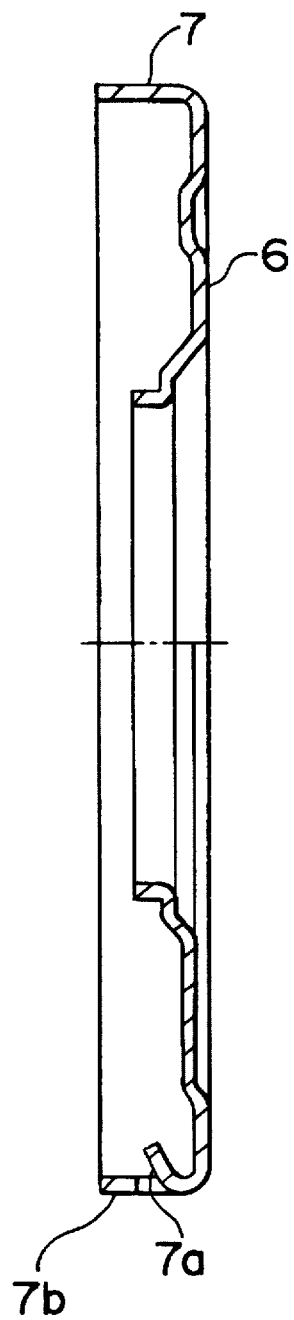
FIG. 3 is a cross sectional view taken along line A—A of FIG. 2.
Figure 4:
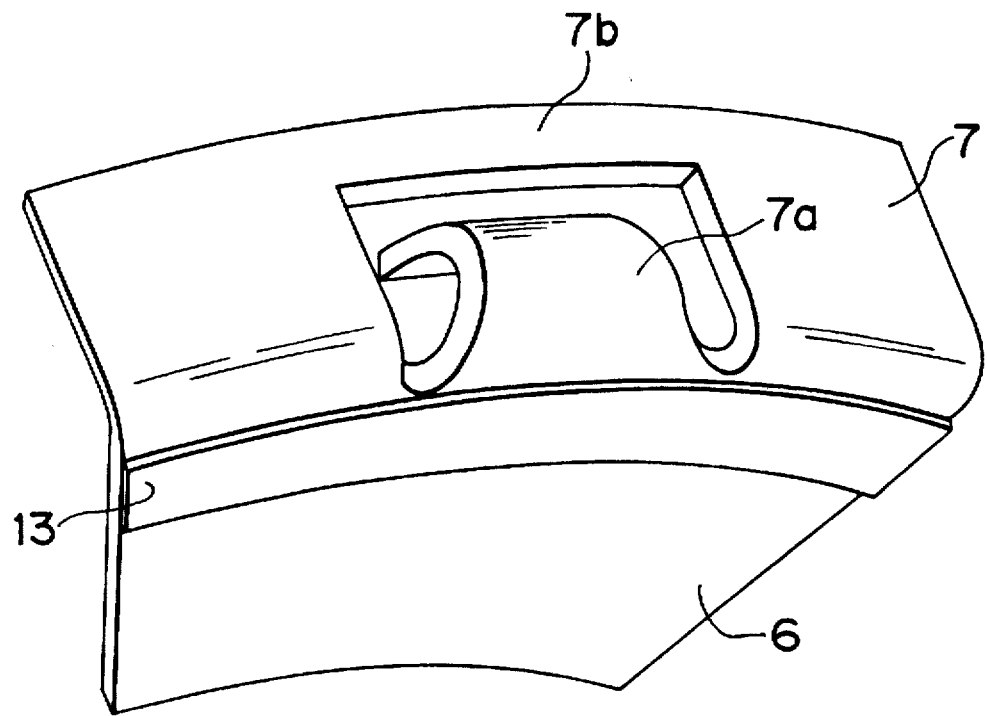
FIG. 4 is a perspective view showing in enlargement a part of the driving plate or flange of FIG. 2.

In FIG. 1, a pump impeller 2 is connected via a converter cover 1 to an input shaft 62 (engine crankshaft). Turbine runner 3 is opposed to the pump impeller 2 with a fluid being present therebetween, and is connected via a turbine hub 11 to an output shaft 60 (transmission input shaft). Torque converter 5 comprises the pump impeller 2, turbine runner 3, and a stator 4 disposed between the pump impeller 2 and the turbine runner 3. The stator 4 is fixed to a transmission case, via a one-way clutch 12.

Lock-up piston 6 is disposed between the turbine runner 3 and the converter cover 1. This lock-up piston 6 receives the driving force through a circulating fluid when a lock-up clutch including the piston 6 is placed in a released position, and connects the input and output shafts with each other when the lock-up clutch is placed in an engaged position. Facing pad 13 is attached and bonded to the lock-up piston 6, such that the pad 13 is pressed against an inner face of the converter cover 1 upon engagement of the lock-up clutch.

Lock-up oil chamber 14 and converter oil chamber 15, which are partially defined by the lock-up piston 6, are connected to a lock-up oil pressure control device (not shown). In operation, a working fluid that is kept at a converter pressure is supplied from the lock-up oil chamber 14 into the converter oil chamber 15 when the lock-up clutch is in the released position, and only the working fluid in the lock-up oil chamber 14 is drained so as to produce a differential pressure used for engagement of the lock-up clutch. The oil pressure of the lock-up clutch may be controlled by draining the lock-up oil chamber 14 in a controlled manner, such that the input and output shafts do not fully engage with each other, but are allowed to rotate relative to each other with a suitable amount of slip.

Lock-up damper 10 comprises a driving plate 7 which also serves as a radially outer flange of the lock-up piston 6, a drive plate 8 in the form of a single annular plate fixed to an outer peripheral portion of a turbine shell 3a, and coil springs 9 mounted between the driving plate 7 and the driven plate 8.

Figure 5:
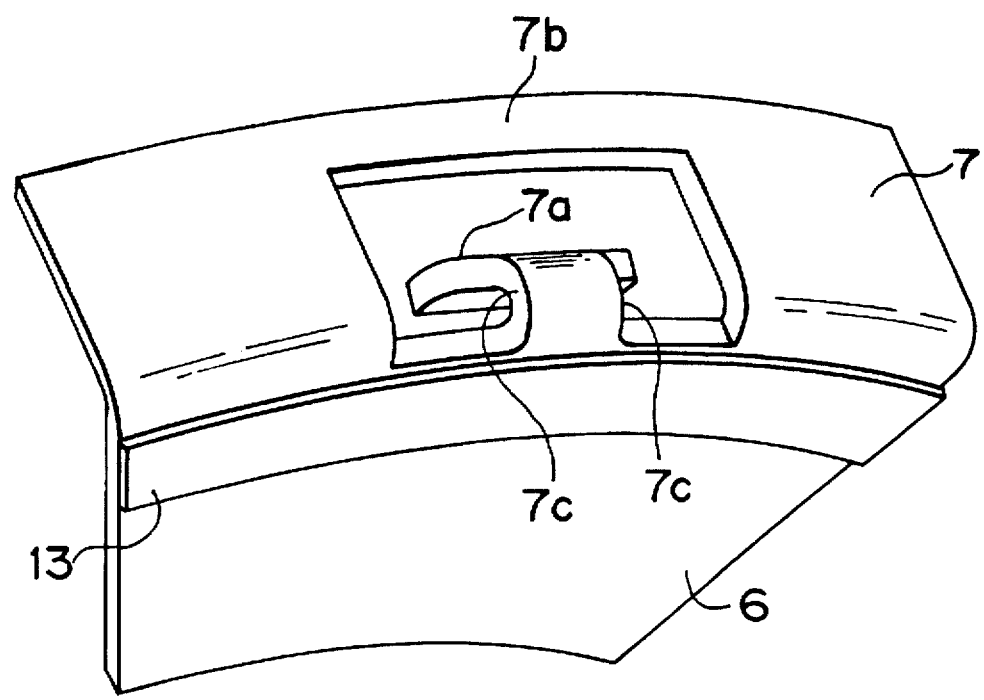
FIG. 5 is a perspective view showing in enlargement a part of a modified example of the driving plate or flange of FIG. 2.

Referring to FIGS. 2 through 5, there will be described the construction of the driving plate or flange 7. The driving plate 7 has eight U-shaped slots formed through the outer flange of the lock-up piston 6, and eight driving claws 7a which are formed by bending inward parts of the flange surrounded by the slots, such that the claws 7a are equally spaced apart from each other in the circumferential direction of the flange. With the driving claws 7a thus formed, an annular reinforcing portion 7b is left at an edge portion of the driving plate or flange 7 to extend over the entire circumference of the flange. As shown in FIG. 5, recesses 7c may be formed on the opposite sides of a proximal end portion of each driving claw 7a of the driving plate 7 at which the claw 7a is bent inward.

Referring FIG. 6 through FIG. 10B, there will be described the construction of the driven plate 8. The driven plate 8 is formed as a single annular plate having inner support faces 81, front support faces 82 and rear support faces 83 for supporting coil springs 9. As shown in FIG. 10B, the distal ends of the front support face 82 and the rear support face 83 are located inside two orthogonal lines L1, L2 that are tangent to the coil spring 9 and extend in parallel to the lock-up piston 6 and the driving plate 7, respectively. Namely, the front and rear support faces 82, 83 do not extend beyond the above two lines L1, L2.

Figure 6:
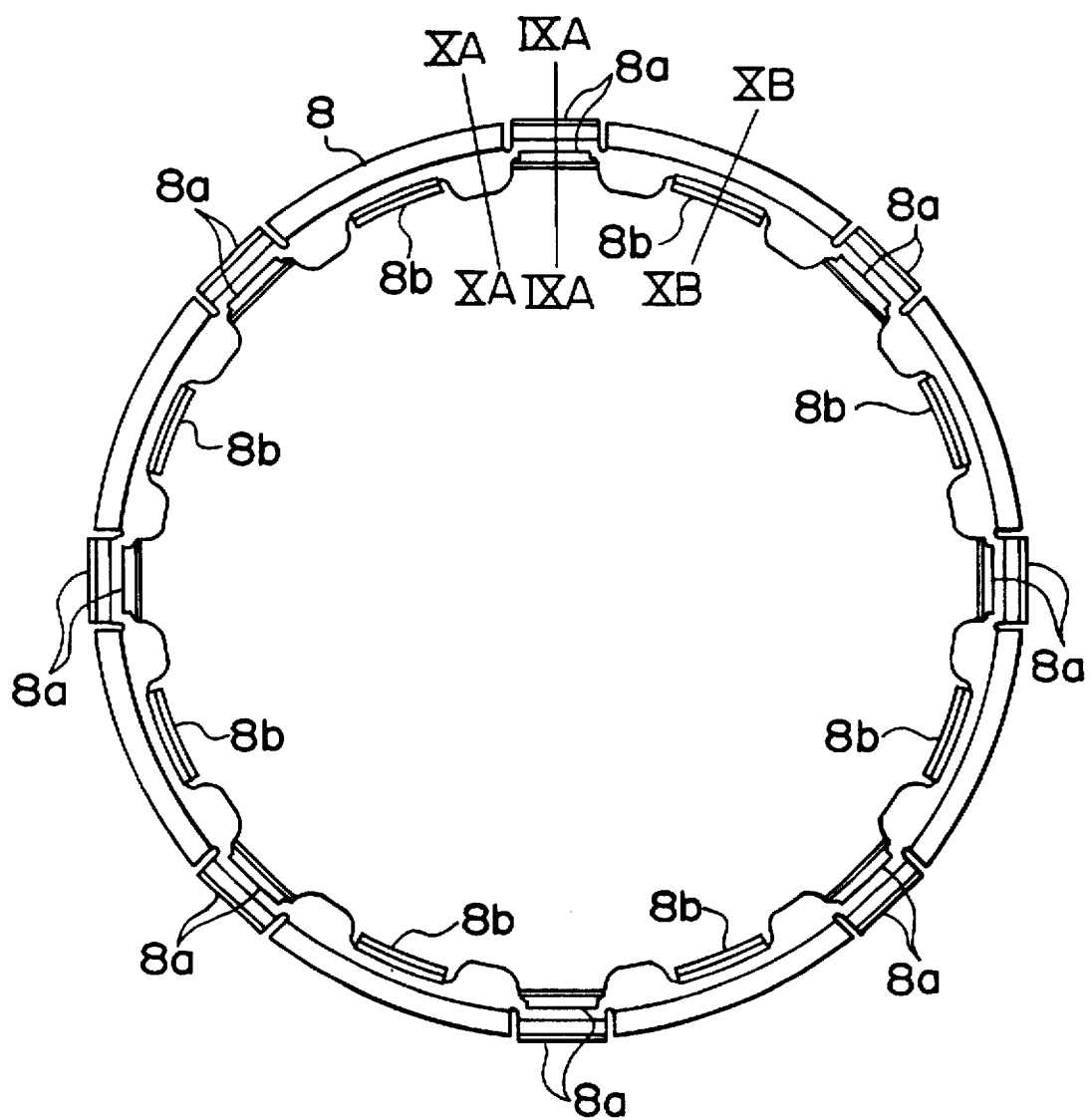
FIG. 6 is a front view showing a driven plate of the lock-up damper of FIG. 1.
Figure 7:
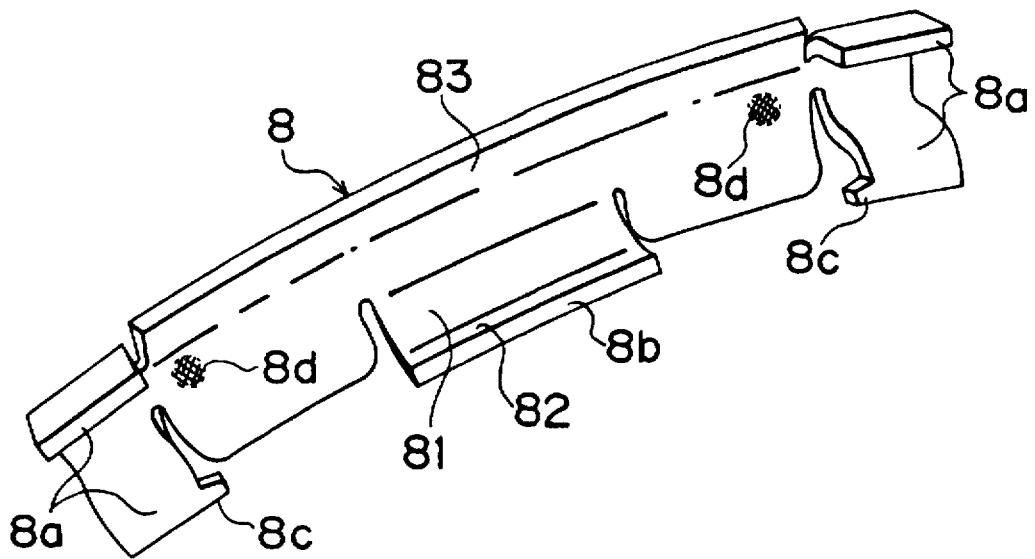
FIG. 7 is a perspective view showing a part of the driven plate of FIG. 6.
Figure 8:
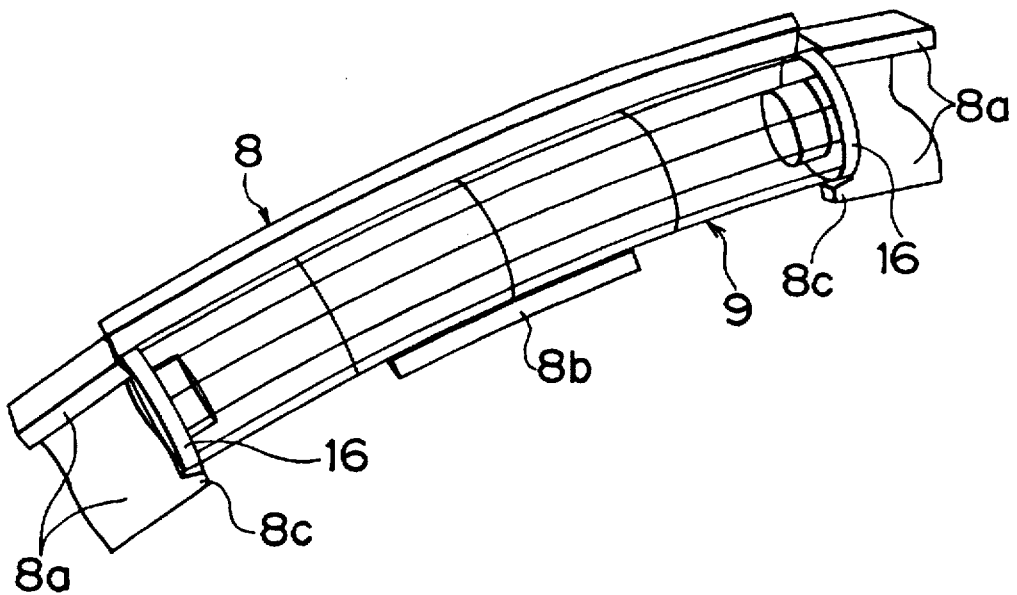
FIG. 8 is a perspective view showing a part of the driven plate of FIG. 6 on which a coil spring is mounted.

The above-indicated inner support faces 81 and front support faces 82 for supporting the coil springs 9 are formed at respective coil spring holder portions 8b of the driven plate 8 which protrude toward the lock-up piston 6, as shown in FIGS. 6 and 7. Each of the coil spring holder portions 8b has a length that is about one third of that of the coil spring 9, and is adapted to support a substantially middle portion of the coil spring 9, as shown in FIG. 8.

Figure 9A:
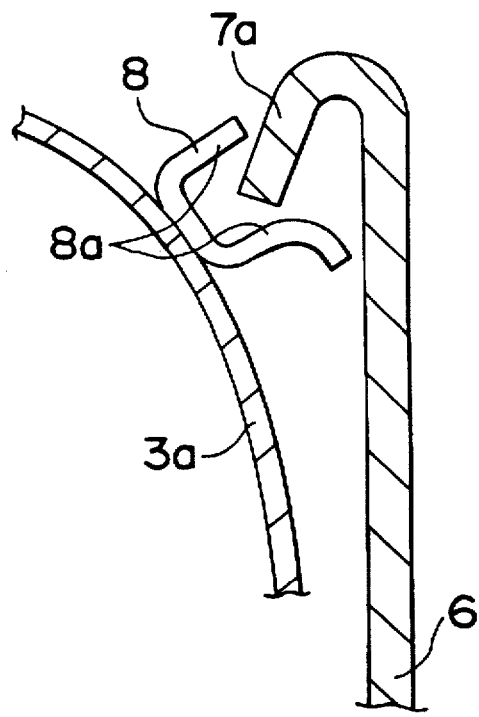
FIG. 9A is a cross sectional view taken along line B—B of FIG. 6.
Figure 9B:
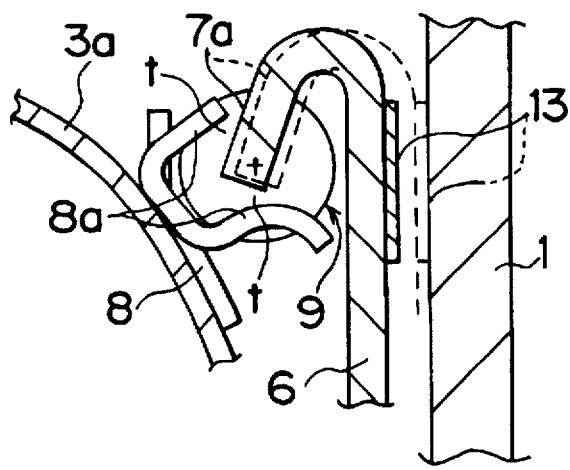
FIG. 9B is a view explaining the operation of the lock-up damper of the first embodiment at the cross section of FIG. 9A.
Figure 10A:
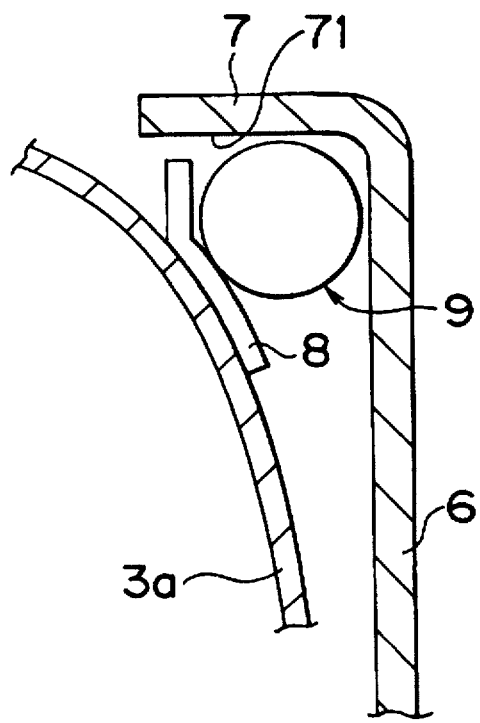
FIG. 10A is a cross sectional view taken along line C—C of FIG. 6.
Figure 10B:
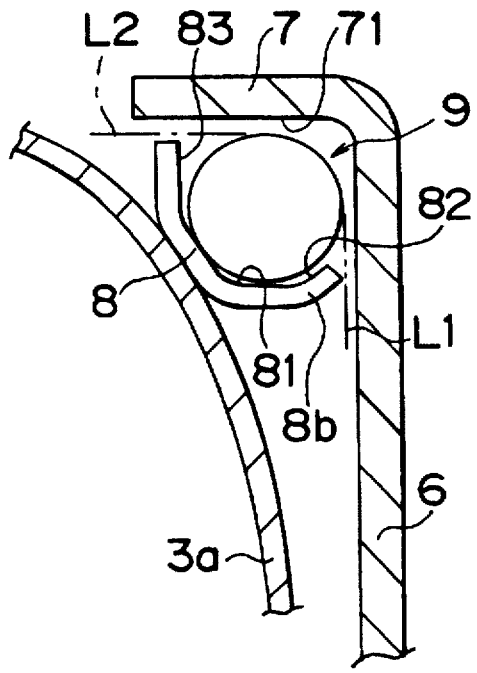
FIG. 10B is a cross sectional view taken along line D—D of FIG. 6.

The driven plate 8 is also formed with U-shaped driven claws 8a which contact end portions of the coil springs 9 through spring sheets 16, over at least a half of the circumference of the coil springs 9, to thus support end faces of the coil springs 9, as shown in FIG. 9B. The driven plate 8 further includes front support portions 8c formed at distal ends of the respective driven claws 8a so as to support the front sides of the coil springs 9.

This driven plate 8 is positioned at the outer peripheral portion of the turbine shell 3a, and fixed to the turbine shell 3a by spot welding, at its fixing portions 8d located in the vicinity of the driven claws 8a, as shown in FIG. 7.

Each of the coil springs 9 is supported at its inner, front and rear sides by the driven plate 8, and is also supported at its outer side by an inner surface 71 of the driving plate 7, as shown in FIG. 10B. It will be understood from FIG. 8 that the front side of the coil spring 9 is supported at three points, that is, the front support face 82 and the opposite front support portions 8c, 8c, and that the opposite end portions of the coil spring 9 are supported by the respective U-shaped driven claws 8a, 8a.

As shown in FIG. 9B, the U-shaped driven claw 8a and the driving claw 7a are positioned such that predetermined clearances t, t are present between these claws 8a, 7a, irrespective of the position of the lock-up piston 6 that moves toward and away from the converter cover 1. Further, the driving claw 7a is positioned such that its load point indicated by "+" in FIG. 9B lies approximately at the center of the coil spring 9 when the lock-up piston 6 is placed in its lock-up engaging position as indicated by dot lines in FIG. 9B.

There will be hereinafter described a lock-up control operation when applied to an automatic transmission of an automobile, by way of example.

The lock-up piston 6 disposed between the turbine runner 3 and the converter cover 1 is actuated by controlling the oil pressure applied thereto, such that the piston 6 is placed in a selected one of lock-up release position and lock-up engaging position, depending upon running conditions of the automobile. The input and output shafts may rotate relative to each other with a suitable amount of slip when the lock-up piston 6 is placed in the lock-up engaging position.

With the lock-up piston 6 placed in the lock-up release position, the drive force is transmitted from the engine crankshaft to the input shaft of the transmission, through a fluid circulating in the pump impeller 2, turbine runner 3 and stator 4, in the same manner as in a torque converter having no lock-up clutch.

When the lock-up piston 6 is pressed against the converter cover 1 to engage the lock-up clutch, the drive force is transmitted from the engine crankshaft to the input shaft of the transmission, via the converter cover 1, lock-up piston 6 (lock-up damper 10), turbine runner 3 and the turbine hub 12. In this state, the engine crankshaft is directly connected to the input shaft of the transmission, to thus establish a lock-up condition, or the engine crankshaft is substantially connected to the transmission input shaft while allowing relative rotation thereof, to thus establish a slip lock-up condition.

There will next be described the manner in which the lock-up damper 10 is installed between the lock-up piston 6 and the turbine shell 3a.

The driving plate or flange 7 is produced by forming the U-shaped slots through the outer flange of the lock-up piston 6, and bending inward parts of the flange surrounded by these slots, so as to form the driving claws 7a.

In the case as shown in FIG. 5, the driving claw 7a is bent at its proximal portion narrowed by the recesses 7c formed on the opposite sides thereof. These recesses 7c make it possible to subtly and accurately control the bending angle of the driving claw 7a, assuring high positional accuracy of the driving claw 7a.

To produce the driven plate 8, appropriate slots or cuts are formed through an annular plate, and appropriate parts of the plate are bent or rounded by predetermined angles, so as to form the driven claws 8a and the coil spring holder portions 8b.

To assemble the lock-up damper 10, the coil springs 9 are held and supported by the driven plate 8 fixed to the outer peripheral portion of the turbine shell 3a. The lock-up piston 6 with the driving plate or flange 7 is then fitted onto the turbine shell 3a in the axial direction such that the driven claws 8a of the driven plate 8 are appropriately positioned in the circumferential direction relative to the driving claws 7a of the driving plate 7. In this manner, the lock-up damper 10 is installed in position.

The driven plate 8 does not include outer support portions for supporting the outer sides of the coil springs 9. This allows the coil springs 9 to be assembled into the driven plate 8, through its openings corresponding to the outer support portions. During the assembling of the lock-up damper 10, the coil springs 9 are sufficiently supported by the inner, front and rear support portions or faces 81, 82, 83 of the driven plate 8.

Upon completion of the assembling of the lock-up damper 10, the outer sides of the coil springs 9 are supported by the inner surface 71 of the driving plate or flange 7, whereby the coil springs 9 are supported at the inner, front and rear sides thereof by the driven plate 8, and at the outer sides by the driving plate 7. Thus, the coil springs 9 are sufficiently supported at all of the inner, outer, front and rear sides between the driving and driven plates 7, 8 when the assembled lock-up damper 10 is installed on the vehicle.

During the above-described lock-up control operation, the drive force transmitted to the lock-up piston 6 suddenly changes to a great extent when the lock-up piston 6 is moved from the lock-up engaging position to the lock-up release position or vice versa.

The transmitted drive force also changes due to changes of the load while the lock-up clutch is placed in its engaged or partially engaged position. In these cases, torsional vibrations included in the transmitted drive force are absorbed by the coil springs 9 that retract and expand upon relative rotary displacement between the driving plate 7 and driven plate 8 of the lock-up damper 10.

As described above, the middle portion of each coil spring 9 is supported by the corresponding coil spring holder portion 8b protruding from the driven plate 8, and the length of the holder portion 8b is about one third of the whole length of the coil spring 9. In this arrangement, the coil spring 9 has relatively long retractable portions on the opposite sides of the holder portion 8b, each of which retractable portions has a length that is about one third of the whole length of the coil spring 9. Thus, the coil spring holder portion 8b does not affect the vibration absorbing function of the coil spring 9 even when torsional vibrations having a relatively large amplitude are applied in the circumferential direction to the coil spring 9. In other words, the coil spring 9 is able to absorb the large-amplitude torsional vibrations, without suffering from interference of the holder portion 8b with the driving plate 7.

The driving plate 7 that also serves as the outer flange of the lock-up piston 6 is formed integrally with the piston 6. Upon application of the torsional vibrations to the lock-up damper 10 in the circumferential direction, therefore, no relative displacement and no rattling take place between the driving plate 7 and the lock-up piston 6.

As described above referring to FIG. 9B, the driven claws 8a of the driven plate 8 and the driving claws 7a of the driving plate 7 are positioned such that the predetermined clearances t, t are kept between these claws 8a, 7a, irrespective of the position of the lock-up piston 6 with respect to the converter cover 1. When the lock-up piston 6 is moved toward and away from the converter cover 1 upon engagement and release of the lock-up clutch, therefore, the driving and driven claws 7a, 8a are prevented from interfering with each other.

Further, the driving claw 7a is positioned such that its load point lies approximately at the center of the coil spring 9 when the lock-up piston 6 is placed in its lock-up engaging position where the lock-up clutch is engaged, as shown in FIG. 9B. When the torsional vibrations are applied in the circumferential direction to the lock-up damper 10, therefore, the coil springs 9 are prevented from twisting or bending due to the load applied from the driving claws 7a to the coil springs 9. Thus, upon engagement of the lock-up clutch, the coil springs 9 retract and expand with the load point of the driving claws 7a being kept in the center of the coil springs 9, so as to effectively absorb the torsional vibrations applied thereto in the circumferential direction.

The driving plate or flange 7 is formed such that the annular reinforcing portion 7b extends continuously over the entire circumference of the edge portion of the outer flange (7) with the driving claws 7a formed inwardly of the edge portion. When a relatively large centrifugal force is applied to the outer flange due to rotation of the lock-up piston 6 upon engagement of the lock-up clutch, therefore, the flexural strength of the driving plate 7 differs only to a small extent between its portions having the driving claws 7a and its portions having no driving claws 7a.

Accordingly, an engaging face of the lock-up piston 6 on which the facing pad 13 is provided does not suffer from waviness due to the difference in the flexural strength between different portions of the driving plate 7, thus assuring a high degree of flatness.

The above arrangement consequently avoids judder that may otherwise occur due to unevenness of the pressure applied to the engaging face of the lock-up piston 6, and a resulting variation in the coefficient of friction. Further, the facing pad 13 provided on the lock-up piston 6 uniformly wears away, in other words, does not suffer from excessive wear in local areas thereof, thereby assuring improved durability and reliability of the facing pad 13.

The driving plate 7 is formed integrally with the lock-up piston 6, and serves as the outer flange of the piston 6. On the other hand, the driven plate 8 is a one-piece component consisting solely of an annular plate, and does not include outer coil spring support portions that need to be reinforced to resist large centrifugal forces applied thereto, which may increase the weight of the lock-up damper 10.

Further, the driving plate 7 can be provided at the outer flange of the lock-up piston 6, without increasing the axial and radial dimensions of the piston 6. The driven plate 8, on the other hand, does not include the outer coil spring support portions that may increase the radial dimension of the plate 8, and does not protrude beyond the outer periphery of the coil spring 9. Thus, the axial and radial dimensions of the lock-up damper 10 can be minimized.

Consequently, the lock-up damper 10 can be accommodated or fitted in a small space defined by the outer peripheral portion of the turbine shell 3a and the inner surface of the lock-up piston 6, which space has a length a little larger than the diameter of the coil spring 9.

Since the driving plate 7 is formed as the outer flange of the lock-up piston 6, without requiring an independent component, the lock-up damper 10 actually comprises only two components, i.e., the driven plate 8 and the coil springs 9. The reduction of the number of components leads to a reduced cost for manufacturing the lock-up damper 10.

The driving plate 7 of the present embodiment yields the following effects.

In the lock-up damper device for the torque converter, the driving plate or flange 7 is formed as an integral part of the lock-up piston 6, such that the driving claws 7a are located inside the outer flange of the piston 6. Thus, the driving plate is available at a reduced cost, and is also free from rattling during transmission of the drive force, for example.

The driving claws 7a of the driving plate 7 are formed by forming slots through the outer flange (7) of the lock-up piston 6, and bending inward parts of the flange (7) surrounded by the slots. Thus, no exclusive component is required to provide the driving plate with the driving claws, and the cost for manufacturing the lock-up damper 10 is thus advantageously reduced.

In the example of FIG. 5, the driving claws 7a are formed by bending parts of the outer flange inwards, and the recesses 7c are formed on the opposite sides of the proximal portion of each driving claw 7a at which the claw 7a is bent inward, assuring high positional accuracy of the driving claw 7a.

The slots or cuts formed through the outer flange of the lock-up piston 6 are U-shaped so that the annular reinforcing portion 7b that extends continuously over the entire circumference of the edge portion of the outer flange (7) is left after the driving claws 7a are formed by bending parts of the flange inside the U-shaped slots. With the annular reinforcing portion 7b thus formed, judder is less likely to occur during engagement of the lock-up clutch, and the facing pad 13 provided on the lock-up piston 6 exhibits improved durability and reliability.

The driven plate 8 of the present embodiment yields the following effects.

In the lock-up damper device for the torque converter, the driven plate 8 is formed as a single annular plate having the inner support faces 81, front support faces 82 and rear support faces 83 for supporting the coil springs 9. The distal ends of the front support face 82 and the rear support face 83 are located inside two orthogonal lines L1, L2 that are tangent to the coil spring 9 and extend in parallel to the lock-up piston 6 and the driving plate 7, respectively. The driven plate 8 thus formed can be provided without significantly increasing the weight of the lock-up damper 10, while minimizing the axial and radial dimensions of the lock-up damper 10.

The inner support faces 81 and front support faces 82 for supporting the coil springs 9 are formed at respective coil spring holder portions 8b of the driven plate 8 which protrude toward the lock-up piston 6. Further, each coil spring holder portion 8b has a length equal to about one-third of the whole length of the coil spring 9, and is adapted to support a substantially middle portion of the coil spring 9. In this arrangement, the coil spring 9 is appropriately supported at the inner and front sides thereof by the inner and front support faces 81, 82, and is able to effectively absorb the torsional vibrations applied thereto in the circumferential direction, without suffering from interference of the coil spring holder portion 8b with the driving plate 7.

The driven plate 8 is also formed with the driven claws 8a for supporting the end faces of the coil springs 9, and the front support portions 8c formed at the distal ends of the driven claws 8a for supporting the front sides of the coil springs 9. Thus, the coil springs 9 are supported or retained in position with high reliability.

The driven plate 8 is positioned at the outer peripheral portion of the turbine shell 3a, and is fixed at its fixing portions 8d in the vicinity of the driven claws 8a to the turbine shell 3a. Thus, the driven plate 8 can be easily and surely integrated with the turbine shell 3a.

The lock-up damper 10 of the present embodiment yields the following effects.

In the lock-up damper device for the torque converter, the lock-up damper 10 comprises the driving plate 7 formed integrally with the outer flange of the lock-up piston 6, the driven plate 8 fixed to the outer peripheral portion of the turbine shell 3a and formed from a single annular plate, and the coil springs 9 mounted between the driving plate 7 and the driven plate 8 and supported at the inner, front and rear sides thereof by the driven plate 8, and at the outer side by the inner surface 71 of the driving plate 7.

This structure does not significantly increase the weight of the lock-up damper 10, and permits the axial and radial dimensions of the damper 10 to be minimized. Further, this lock-up damper 10 is free from rattling.

The drive plate 8 is formed with the U-shaped driven claws 8a that contact end portions of the coil springs 9 through the spring sheets 16, over at least a half of the circumference of the coil springs 9. The driving plate 7 is formed with the driving claws 7a. The corresponding driven claw 8a and driving claw 7a are positioned such that the predetermined clearances t, t are present between these claws 8a, 7a, irrespective of the position of the lock-up piston 6 that moves toward and away from the converter cover 1. Thus, the end faces of the coil springs 9 are supported by the driven claws 8a with high reliability, and the driving and driven claws 7a, 8a are prevented from interfering with each other, irrespective of the position of the lock-up piston 6 relative to the converter cover 1.

The driving claw 7a of the driving plate or flange 7 is formed such that the load point of the claw 7a lies approximately at the center of the coil spring 9 when the lock-up piston 6 is placed in the lock-up engaging position. In this arrangement, the coil springs 9 are capable of effectively absorbing torsional vibrations upon or during engagement of the lock-up clutch.

Figure 11:
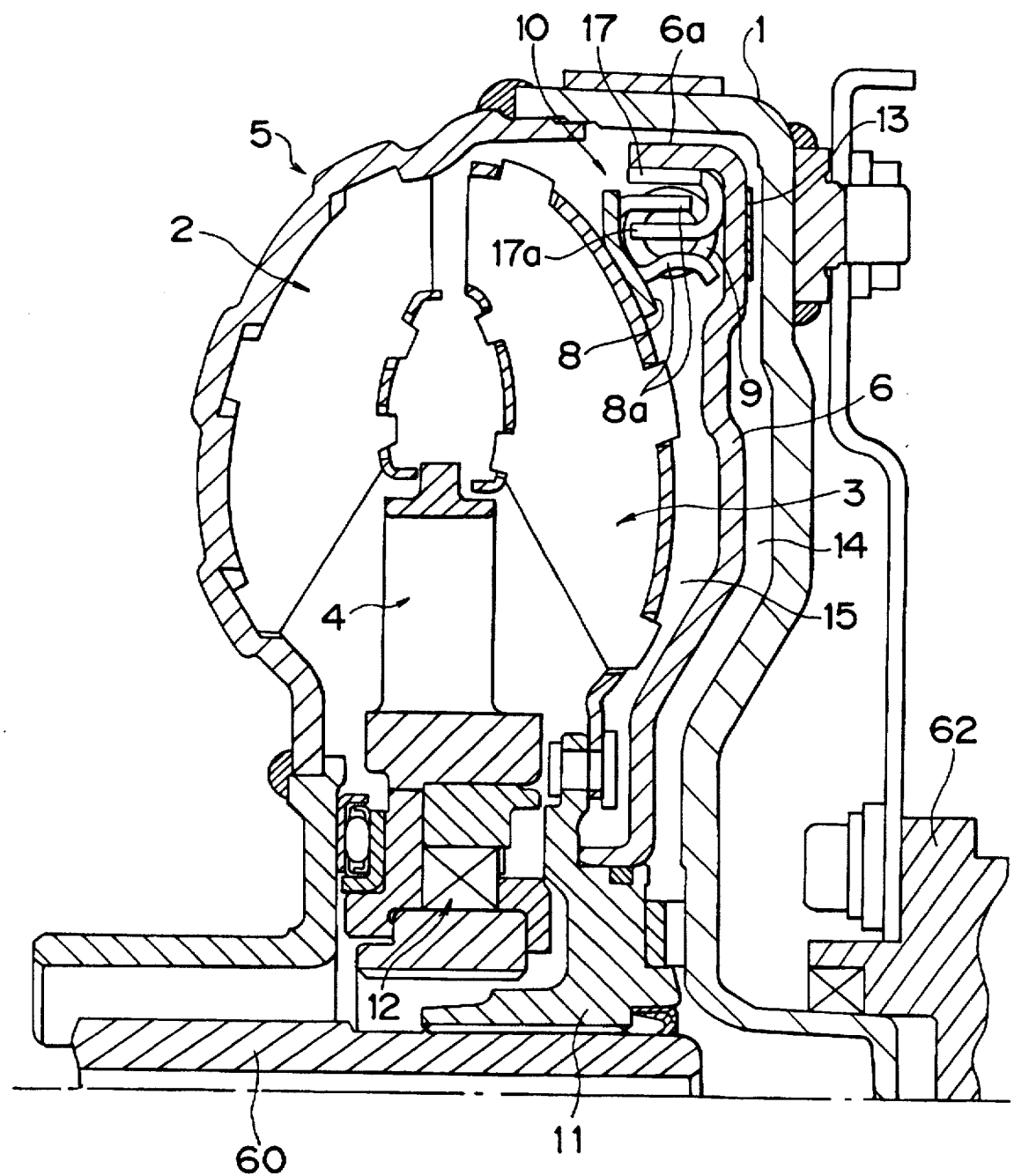
FIG. 11 is a cross sectional view showing a torque converter including a lock-up damper device constructed according to a second embodiment of the present invention.
Figure 12:
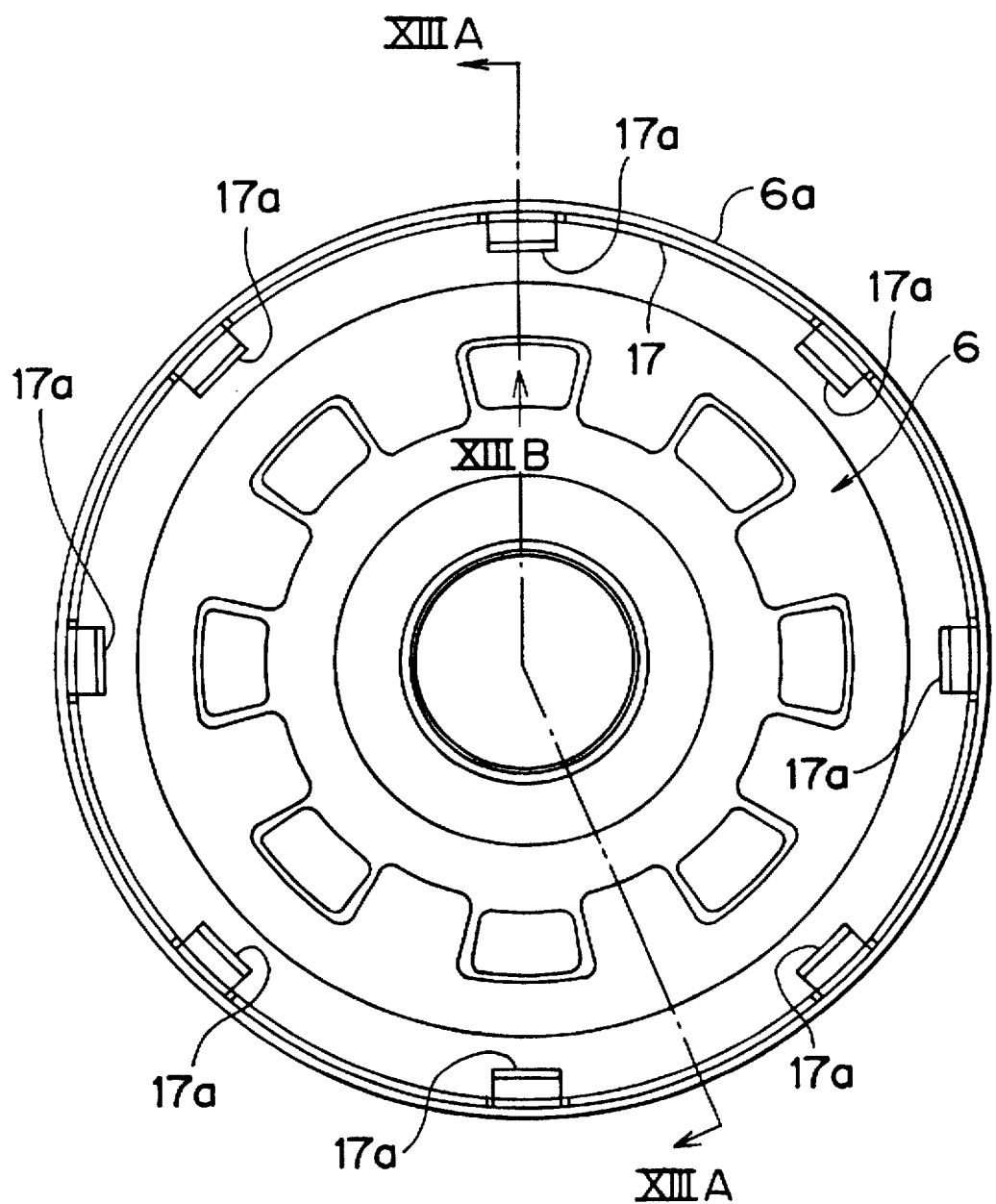
FIG. 12 is a front view showing a lock-up piston having a driving plate of the lock-up damper of FIG. 11.
Figure 13A:
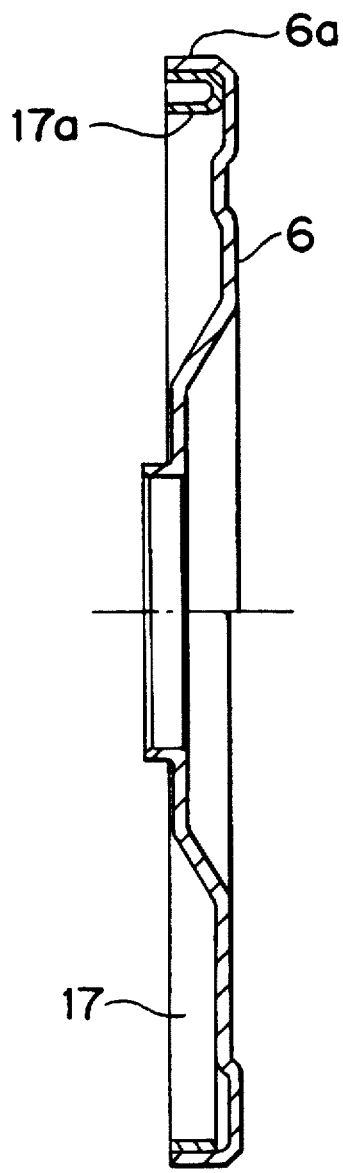
FIG. 13A is a cross sectional view taken along line E—E of FIG. 12.
Figure 13B:
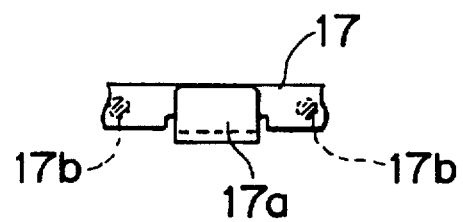
FIG. 13B is a view of the driving plate as seen in the direction of arrow F of FIG. 12.
Figure 14A:
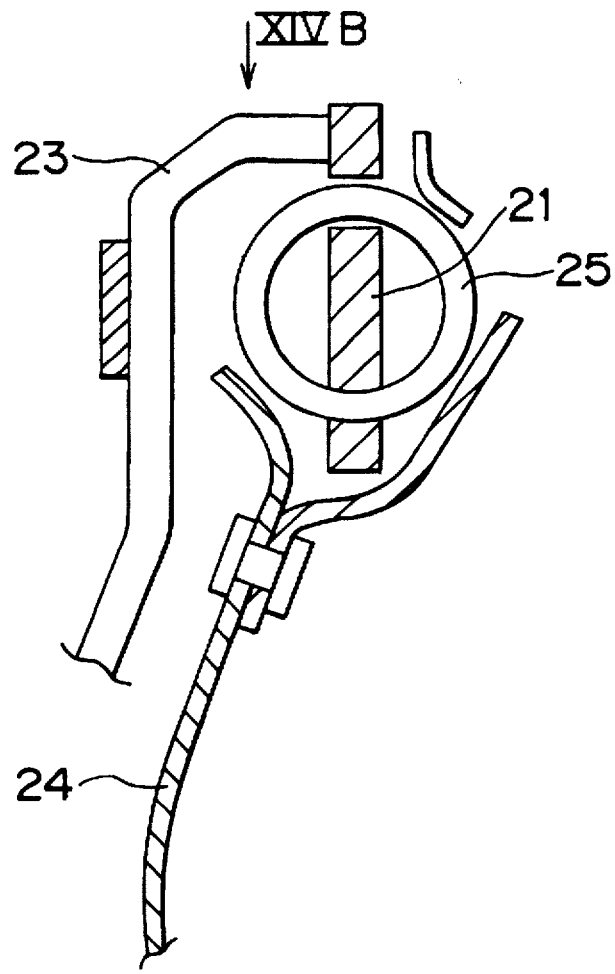
FIG. 14A is a cross sectional view showing a first example of conventional lock-up damper.
Figure 14B:
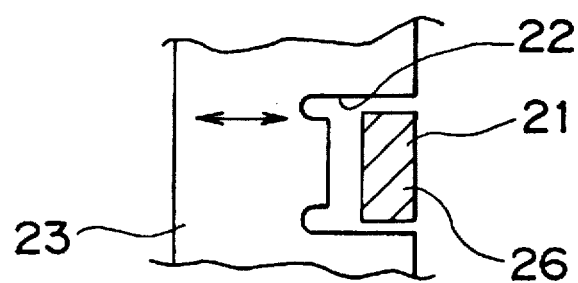
FIG. 14B is a view of a lock-up piston and a driving plate as seen in the direction of arrow G of FIG. 14A.
Figure 14C:
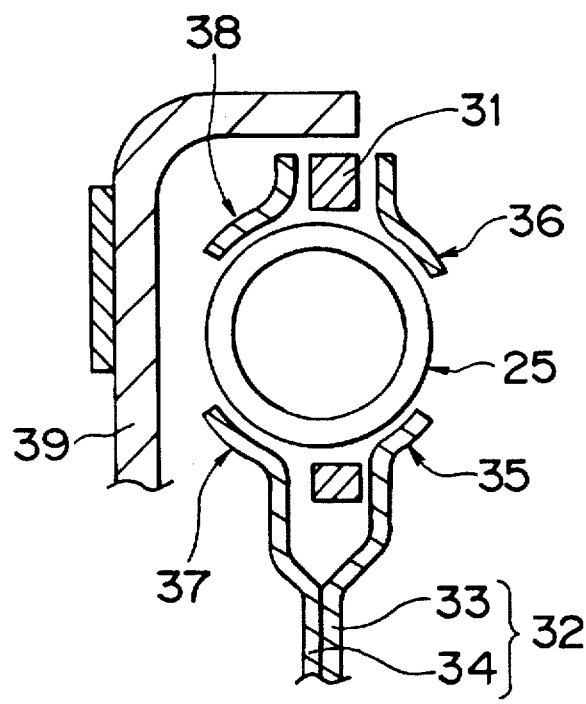
FIG. 14C is a cross sectional view showing a second example of conventional lock-up damper.
Figure 15:
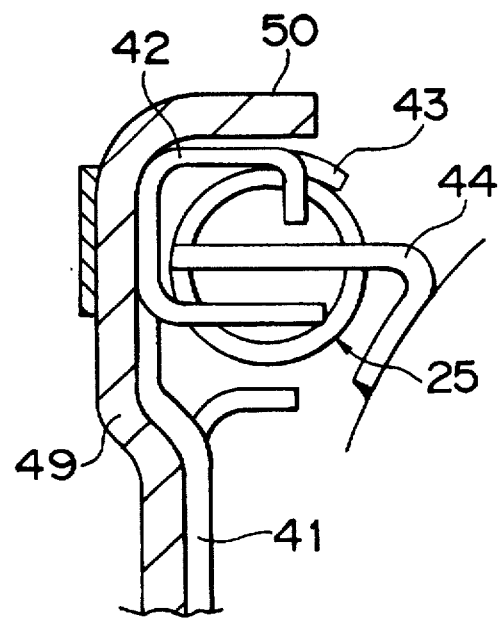
FIG. 15 is a cross sectional view showing a third example of conventional lock-up damper.

Referring next to FIG. 11 through FIG. 13 showing the second embodiment of the present invention, a driving plate 17 consists of a single annular plate through which a plurality of driving claws 17 are formed. This driving plate 17 is fixed at its spot welding portions 17b to an inner surface of a radially outer flange 6a of the lock-up piston 6, such that the driving plate 17 is integral with the lock-up piston 6.

To attach the driving plate 17 to the lock-up piston 6, a single elongate plate with a plurality of driving claws 17a is formed into an annular shape, to provide the driving plate 17, which is then fixed by spot welding to the inner surface of the outer flange 6a of the lock-up piston 6.

The driving plate of the present embodiment yields the following effect, as well as the above-indicated effects.

The drive plate 17 consisting of a single annular plate with a plurality of driving claws 17a is fixed to the inner surface of the radially outer flange 6a of the lock-up piston 6.

Thus, the present invention is applicable to a conventional lock-up piston without changing the design of the piston.

While the preferred embodiments of the present invention have been described in detail referring to the drawings, it is to be understood that the present invention is by no means limited to details of the illustrated embodiments, but may be embodied with various changes or additions, without departing from the scope and spirit of the present invention.

While the present invention is applied to torque converters in the illustrated embodiments, the invention is also applicable to other fluid transmission devices, such as a fluid coupling.

What is claimed is:

1. An apparatus comprising:

a fluid transmission device comprising a cover, a pump impeller connected to an input shaft of the device through the cover, and a turbine runner connected to an output shaft of the device and disposed such that the turbine runner is opposed to the pump impeller with a fluid being present therebetween;

a lock-up piston disposed between said turbine runner and said cover of said fluid transmission device, and selectively placed in one of a lock-up release position for transmitting a drive force through the fluid circulating in the fluid transmission device, and a lock-up engaging position for directly connecting said input shaft and said output shaft with each other to transmit the drive force; and a lock-up damper for absorbing torsional vibrations included in the drive force when said lock-up piston is placed in said lock-up engaging position, said lock-up damper comprising a driving plate disposed on a side of said lock-up piston, a driven plate disposed on a side of said turbine runner, and a plurality of coil springs mounted between the driving plate and the driven plate;

wherein said driving plate is located inside a radially outer flange of said lock-up piston and is integral with the lock-up piston;

wherein said driving plate has a plurality of slots formed through said radially outer flange of said lock-up piston, and a plurality of driving claws formed by bending inward parts of the radially outer flange at a proximal portion thereof surrounded by said slots; and wherein recesses are formed on the opposite sides of the proximal portion of said each driving claw.

2. An apparatus as defined in claim 1, wherein said plurality of slots are U-shaped, so that said driving plate includes an annular reinforcing portion formed at an edge portion thereof to continuously extend over an entire circumference of the driving plate, with said driving claws formed inwardly of the annular reinforcing portion.

3. An apparatus comprising:

a fluid transmission device comprising a cover, a pump impeller connected to an input shaft of the device through the cover, and a turbine runner connected to an output shaft of the device and disposed such that the turbine runner is opposed to the pump impeller with a fluid being present therebetween;

a lock-up piston disposed between said turbine runner and said cover of said fluid transmission device, and selectively placed in one of a lock-up release position for transmitting a drive force through the fluid circulating in the fluid transmission device, and a lock-up engaging position for directly connecting said input shaft and said output shaft with each other to transmit the drive force; and a lock-up damper for absorbing torsional vibrations included in the drive force when said lock-up piston is placed in said lock-up engaging position, said lock-up damper comprising a driving plate disposed on the side of said lock-up piston, a driven plate disposed on a side of said turbine runner, and a plurality of coil springs mounted between the driving plate and the driven plate;

wherein said driven plate has an inner support face, a front support face and a rear support face for supporting each of said plurality of coil springs, said front support face and said rear support face having respective distal ends located inside two orthogonal lines that are tangent to a periphery of said each coil spring and extend in parallel with said lock-up piston and said outer flange of the lock-up piston.

4. An apparatus as defined in claim 3, wherein said driven plate includes a coil spring holding portion protruding toward said lock-up piston for supporting each of said coil springs, said coil spring holding portion providing said inner support face and said front support face, so as to hold substantially a middle portion of said each coil spring, said coil spring holding portion having a length that is about one third of that of said each coil spring.

5. An apparatus as defined in claim 3, wherein said driven plate includes a plurality of driven claws for supporting end faces of said coil springs, each of said driven claws having a front support portion formed at a distal end thereof for supporting a front side of a corresponding one of said coil springs.

6. An apparatus as defined in claim 3, wherein said driven plate is disposed at an outer peripheral portion of a turbine shell of said turbine runner, and includes fixing portions in the vicinity of said driven claws at which the driven plate is integrated with the turbine shell.

7. An apparatus comprising:
- a fluid transmission device comprising a cover, a pump impeller connected to an input shaft of the device through the cover, and a turbine runner connected to an output shaft of the device and disposed such that the turbine runner is opposed to the pump impeller with a fluid being present therebetween;
- a lock-up piston disposed between said turbine runner and said cover of said fluid transmission device, and selectively placed in one of a lock-up release position for transmitting a drive force through the fluid circulating in the fluid transmission device, and a lock-up engaging position for directly connecting said input shaft and output shaft with each other to transmit the drive force; and
- a lock-up damper for absorbing torsional vibrations included in the drive force when said lock-up piston is placed in said lock-up engaging position, said lock-up damper comprising a driving plate disposed on a side of said lock-up piston, a driven plate disposed on a side of said turbine runner, and a plurality of coil springs mounted between the driving plate and the driven plate;

wherein said driving plate is integral with an outer flange of said lock-up piston, and said driven plate consists of a single annular plate fixed to an outer peripheral portion of a turbine shell of said turbine runner, each of said coil springs having inner, front and rear sides supported by said driven plate, and an outer side supported by an inner surface of said driving plate.

8. An apparatus as defined in claim 7, wherein said driven plate includes a plurality of U-shaped driven claws which contact end portions of said coil springs through spring sheets, over at least half of a circumference of each of the coil springs, said driving plate including a plurality of driving claws that are kept spaced apart from said driven claws by a predetermined distance irrespective of a position of said lock-up piston relative to said cover of said fluid transmission device.

9. An apparatus as defined in claim 7, wherein each of said driving claws of the driving plate has a load point located approximately at the center of a corresponding one of said coil springs when said lock-up piston is placed in said lock-up engaging position.

10. An apparatus comprising:
- a fluid transmission device comprising a cover, a pump impeller connected to an input shaft of the device through the cover, and a turbine runner connected to an output shaft of the device and disposed such that the turbine runner is opposed to the pump impeller with a fluid being present there between;
- a lock-up piston disposed between said turbine runner and said cover of said fluid transmission device, and selectively placed in one of a lock-up release position for transmitting a drive force through the fluid circulating in the fluid transmission device, and a lock-up engaging position for directly connecting said input shaft and said output shaft with each other to transmit the drive force; and
- a lock-up damper for absorbing torsional vibrations included in the drive force when said lock-up piston is placed in said lock-up engaging position, said lock-up damper comprising a driving plate disposed on a side of said lock-up piston, a driven plate disposed on a side of said turbine runner, and a plurality of coil springs mounted between the driving plate and the driven plate;

wherein said driving plate is located inside a radially outer flange of said lock-up piston and is integral with the lock-up piston;

wherein said driving plate has a plurality of slots formed through said radially outer flange of said lock-up piston, and a plurality of driving claws formed by bending inward parts of the radially outer flange surrounded by said slots; and wherein said plurality of slots are U-shaped, so that said driving plate includes an annular reinforcing portion formed at an edge portion thereof to continuously extend over an entire circumference of the driving plate, with said driving claws formed inwardly of the annular reinforcing portion.

* * * * *